US006384573B1

(12) United States Patent
Dunn

(10) Patent No.: US 6,384,573 B1
(45) Date of Patent: May 7, 2002

(54) COMPACT LIGHTWEIGHT AUXILIARY MULTIFUNCTIONAL RESERVE BATTERY ENGINE STARTING SYSTEM (AND METHODS)

(76) Inventor: James Dunn, 24 Eastern Pt, Shrewbury, MA (US) 01545

( * ) Notice: Subject to any disclaimer, the term of this patent is extended or adjusted under 35 U.S.C. 154(b) by 0 days.

(21) Appl. No.: 09/645,870

(22) Filed: Aug. 23, 2000

Related U.S. Application Data

(63) Continuation-in-part of application No. 09/438,248, filed on Nov. 12, 1999.
(60) Provisional application No. 60/151,234, filed on Aug. 27, 1999, and provisional application No. 60/108,269, filed on Nov. 12, 1998.

(51) Int. Cl.$^7$ ................................. H02J 7/00
(52) U.S. Cl. ...................... 320/107; 320/104
(58) Field of Search ............... 320/107, 103, 320/104, 105, 117; 429/99, 100

(56) References Cited

U.S. PATENT DOCUMENTS

| | | | | | |
|---|---|---|---|---|---|
| 3,742,302 | A | * | 6/1973 | Neill .......................... | 361/22 |
| 4,157,492 | A | * | 6/1979 | Colbrese ..................... | 320/105 |
| 4,746,853 | A | * | 5/1988 | Ingalls ........................ | 320/105 |
| 4,869,688 | A | * | 9/1989 | Merio ......................... | 320/105 |
| 6,046,514 | A | * | 4/2000 | Rouillard et al. ........... | 320/122 |

* cited by examiner

*Primary Examiner*—Peter S. Wong
*Assistant Examiner*—Lawrence Luk
(74) *Attorney, Agent, or Firm*—Rutan & Tucker, LLP

(57) ABSTRACT

A self-contained, battery powered, on board auxiliary starting device provides high DC power levels for short durations for starting engines. Preferred devices have a battery, a connector terminal assembly, and a monitor/control circuit that controls the charging and use of the auxiliary battery, and limits the device output to safe voltage levels so the auxiliary battery is not damaged due to overdischarge. The connector terminal assembly preferably has 2 or more contacts, sized and dimensioned to electrically contact (mate) with selected electric power harnesses selected to connect to and provide auxiliary power to augment standard batteries. In another aspect of preferred embodiments, the coupling mechanism and mounting bracket allow the battery to be quickly removed from the principal mounting bracket and quickly installed on another engine or be connected to a special set of mating cables with clamps for attachment across another battery for augmenting its power. Commercial devices may advantageously include multiple batteries in a small carrying case, and have the appropriate capacity, voltage and connectors for starting a specific type of engine. For example, an especially preferred device has connectors suitable for starting 12 V or 24 V powered engines. Such devices may advantageously have an overall rectangular shape, such as 3×4×7 inches, and may weigh only about 5 pounds.

16 Claims, 5 Drawing Sheets

COMPACT LIGHTWEIGHT AUXILIARY MULTIFUNCTIONAL RESERVE BATTERY ENGINE STARTING SYSTEM (AND METHODS)

This application is a continuation-in-part of U.S. utility application Ser. No. 09/438,248 filed on Nov. 12, 1999, and also claims the priority of U.S. provisional application No. 60/151234 filed on Aug. 27, 1999 and U.S. utility application 09/441,636 all of which are incorporated herein by reference in its entirety. This application is a utility application for a new concept for a versatile on-board auxiliary backup battery and charging/control system for starting engines for vehicles, boats and other engine starting applications, both onboard, and external to the installed vehicle also claims benefit of provisional application Ser. No. 60/108,269 filed Nov. 12, 1998.

FIELD OF INVENTION

The field of the invention is DC power systems. Of special interest are auxiliary compact multifunction DC power systems for use in starting automobile and truck engines, boat engines, tractor engines, industrial engines, generators and other applications where high current auxiliary DC power is required for short durations to augment the standard starting battery.

BACKGROUND

There is a problem that frequently occurs with (engine) starting batteries on vehicles, boats, and other applications when headlights are left on, or other power consumption devices are left operating such that the original (primary) starting battery becomes depleted and is unable to start the engine. This problem can be even more serious in adverse weather such as cold and wintery conditions, or stormy weather, or if the condition of the primary starting battery is already marginal do to age, improper charging, or other malfunction. Additional concerns occur if there is an emergency situation for which it is critical to start the engine, such as for starting the emergency generator for a hospital, or starting emergency vehicles.

Numerous auxiliary DC power sources are available for starting engines of trucks, automobiles, boats and other applications like generators and industrial and farm machinery. These applications generally involve either the installation of a second battery usually similar in size and weight to the primary battery, and a switch to select either battery (or both), or the use of an external source like a portable starting pack with cables to connect to a battery or long "jumper cables" for delivering power drawn from another vehicle, or external battery. The either or both vehicles can occur if the polarity is accidentally reversed in connecting the cables, or if a spark ignites gas fumes from the engine or hydrogen from the batteries. In addition, when using jumper cables, the second vehicle's battery must be positioned within the length of the jumper cables, which is often a problem if the disabled vehicle is tightly parked or otherwise difficult to access. Another problem that is sometimes encountered with "jump starting" certain engines like those in airplanes, is that the (external) auxiliary electrical contacts for receiving power on some applications may require specialized connectors, making it difficult to utilize general purpose battery packs and "jumper cables" as an external power source. Also, some users including many elderly people and some women, are reluctant to use devices requiring the user to make dangerous electrical connections, particularly at night.

In some cases the user may have an external battery pack in his vehicle or boat but discover that, when he/she needs it to start their engine, the battery in the portable pack is not fully charged or has run down to the point where there is insufficient energy remaining to start the target engine. Also, in many cases where the starting battery is run down and unable to start the vehicle's engine, the driver may not have ready access to a portable power pack (or jumper cables and a second vehicle from which to connect the jumper cables, if available).

Additional problems exist where relatively long cables (i.e. cables greater than 5 feet in length) are used. For example, long cables can cause significant resistive energy losses due to the high current being transmitted, resulting in lower voltages at the engine starter, and adversely affecting starting performance. Long cables also tend to be heavy and cumbersome. Still further, long cables tend to have a relatively short lifespan due to exposure, frequent twisting, and or other stresses arising from use and storage. Thus there is a continuing need to develop simpler and more reliable devices for instantly providing auxiliary (reserve) DC power for starting automobiles, boats, trucks, tractors, generators and other engines, without the user needing to locate the battery, identify the battery terminal polarity, and properly connect the appropriate cables or portable starting unit.

SUMMARY OF INVENTION

The present invention provides light weight, self-contained, battery powered, auxiliary multifunction starting devices that can be located on board the vehicle, directly wired-in and continually charged for use in applications requiring high DC power levels for short durations; and methods of using same on, or remote from, the installed vehicle, boat, or other device. This same auxiliary starting device can be easily and quickly removed from the initial installation to be recharged externally or used to start another engine with a simple mating cable assembly.

Preferred devices have a battery, a solenoid or other switching device to connect the battery into the vehicle electrical system for use, and a charging/control circuit that keeps the auxiliary battery charged, and (optionally) limits the device output to safe voltage levels so the auxiliary battery is not damaged from over-discharge, a connector terminal for making/breaking connections when device is inserted or removed from installed bracket and harness, a containment device and mounting bracket, and a special connector terminal and wiring assembly for installation on various vehicles/engines. The connector terminal assembly preferably has 2 or more contacts, sized and dimensioned to electrically contact (mate) with selected mating connector harness which is (pre)connected to the engines standard battery or the electric starter power input terminals. Device may also be easily removed from vehicle for use in starting another engine or for recharging from another source, including a separate AC powered charger. Commercial devices may advantageously include one or more batteries in a small carrying case, and have the appropriate capacity, voltage and connectors for starting a specific type of engine. For example, an especially preferred device has capability and connectors suitable for starting a 12 V gasoline or diesel powered engine. Such devices may advantageously have an overall size of less than 120 cubic inches, and may weigh less than 12 pounds.

Contemplated methods include the steps of: providing a self-contained auxiliary battery starting system containing a battery (or bank of batteries); initially connecting the special cable harness and mounting bracket into the selected vehicle, and mounting and charging the auxiliary battery either automatically (from the alternator) whenever the engine to which the device is attached is operated, or externally from a separate battery charger. To draw starting power from the device, the user pushes the control button on the device so that it electrically connects the auxiliary battery to the primary battery or starter input terminal providing power to an electric starter or directly to the original battery; starting the engine in the normal manner; whereupon the device automatically reverts to standby mode, where it will automatically be recharged from the alternator on the engine, and disconnected (electrically isolated by the solenoid) from any vehicle power drain so it will not be discharged or "run down" if lights or other power consuming devices are left on while the engine is off.

DETAILED DESCRIPTION

Figure 1:
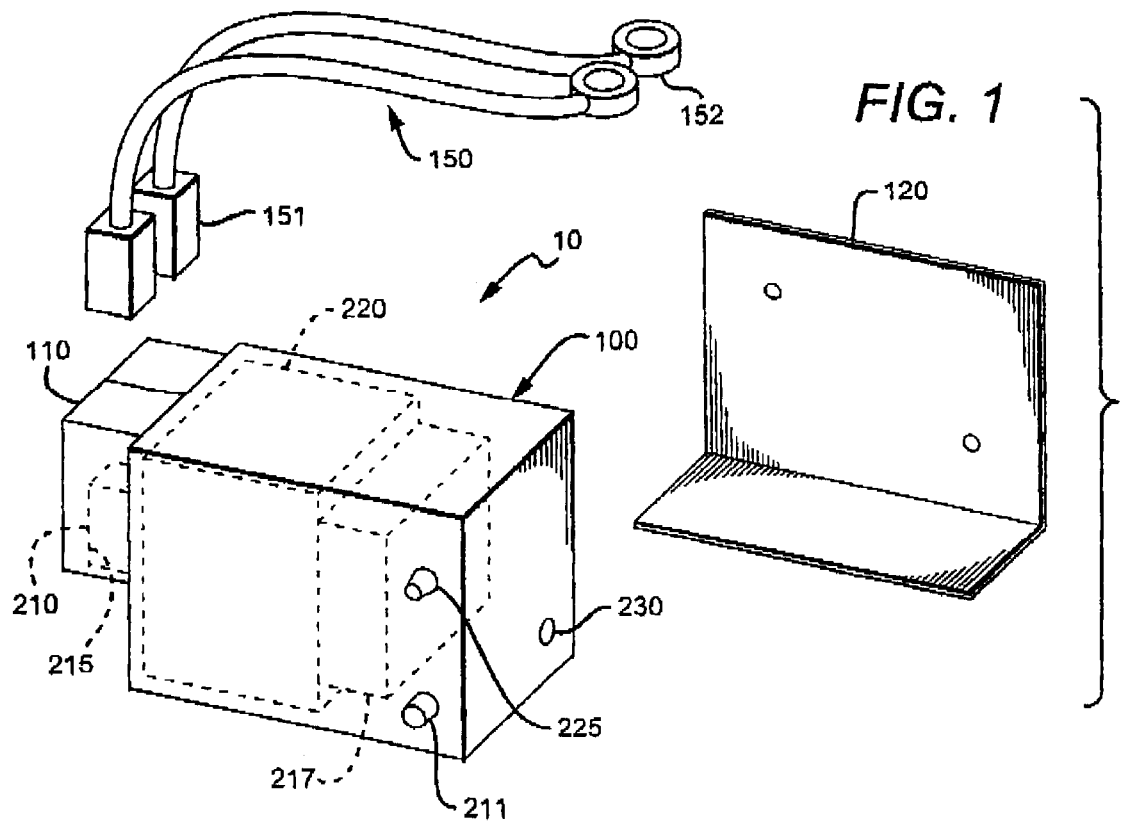
FIG. 1 is a simple diagram of the components of an apparatus according to the present invention.

In FIG. 1, a battery powered auxiliary starting device 10 generally includes a housing 100, connector terminals 210, and control terminal 211, and may comprise control switch 225, and recharge socket 230. The housing 100 has a rectangular or similar shape, with an end 110 comprising a connector terminal or plug 210. As used herein the term "compact" means something that weighs no more than 12 pounds, and has total linear dimensions (avg. length plus avg. height plus avg. width) of no more than 20 inches.

Figure 2:
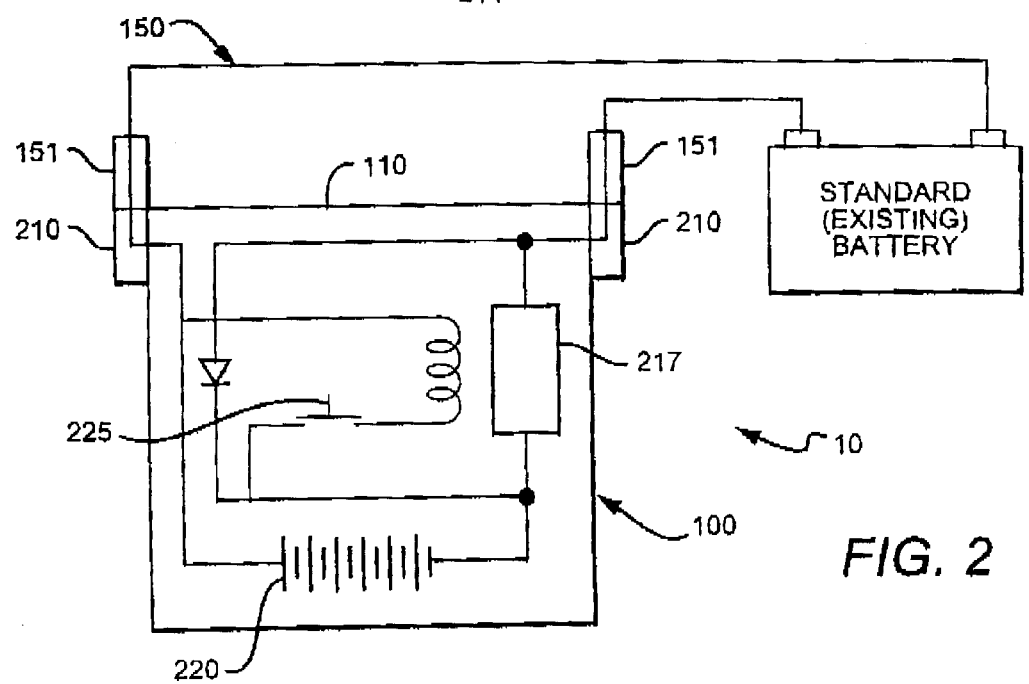
FIG. 2 is a schematic of the apparatus of FIG. 1.

In FIG. 2, the battery powered starting device 10 has, within the lower portion of housing/enclosure 100, connector terminals/contacts 210, control terminal 211 (not shown), solenoid or switch 217, batteries 220, and control switch 225 (not shown), and optional recharge socket 230 (not shown).

Batteries 220 (see FIGS. 2–3) are preferably of the thin film type, having thin metal electrodes separated by insulating materials like glass cloth, with the electrode and cloth layers rolled up. Any suitable high power battery chemistry can be employed, including nickel cadmium, nickel zinc, nickel metal hydride, and lithium ion chemistries. Preferred batteries provide power surges of up to approximately 500 Amps for short durations, are compact in size and light in weight, operate in cold temperatures, have a relatively flat discharge voltage, are capable of storing at least 1.0 AH of energy, have little or no memory effect from partial discharge/charge cycles, generate only minor excess heat while operating, and are cost effective. The term "compact in size" is used herein to mean that an embodiment's size is kept relatively close to that of the batteries and switching device enclosed within it, and that the volume taken by the batteries is less than V cubic inches where V is 160, 120, 90, 80, 60, 50, 40, 30, or 20. The term "light in weight" is used herein to indicate that an embodiment weighs less than N lbs. where N is 20, 15, 10, 5, or 3.

Figure 3:
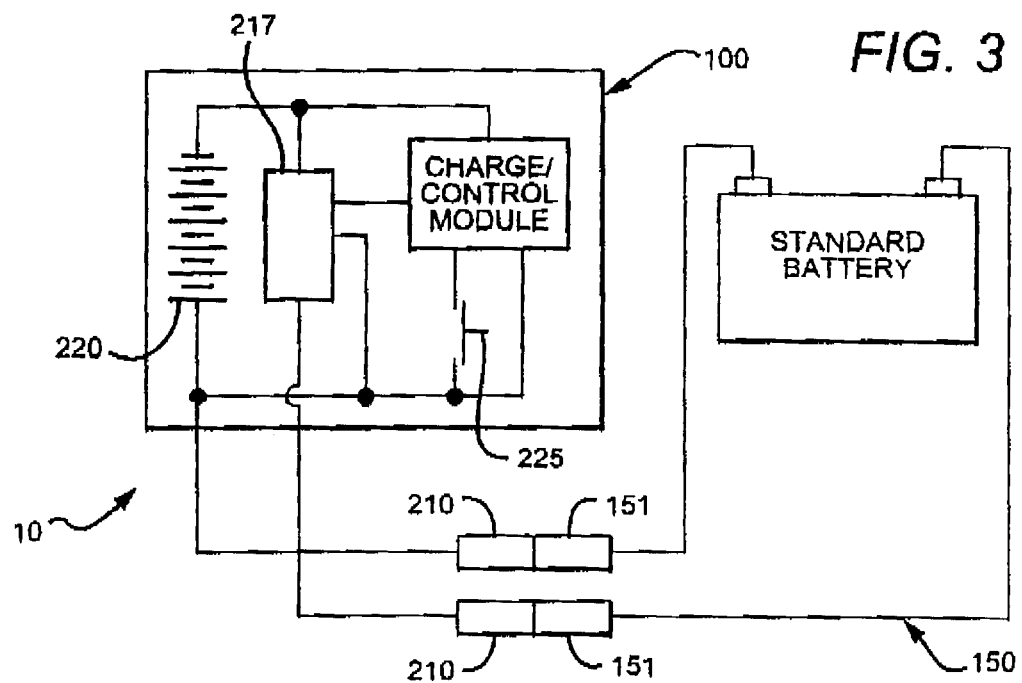
FIG. 3 is a schematic of an improved embodiment, including a special charging/control circuit board.
Figure 4:
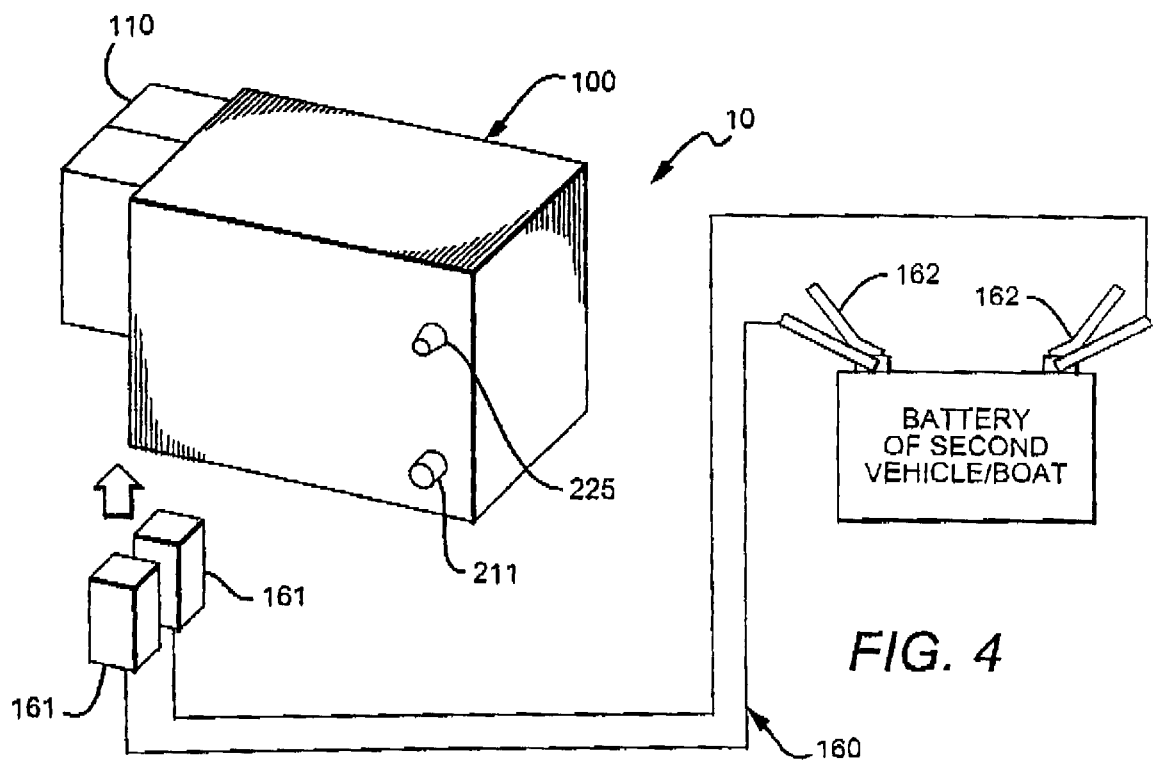
FIG. 4 is a schematic of a method for using the device to start another engine or vehicle according to the present invention.

FIG. 3 shows a highly preferred embodiment in which batteries 220 are connected in series. Less preferred embodiments may, however, use other configurations such as having all the batteries connected in parallel, or having some batteries in parallel and some serially connected (series-parallel). Alternative embodiments may augment one or more of batteries 220 with one or more super capacitors, or use super capacitors alone.

Recharge socket 230 (see FIG. 1) may be included in a particular embodiments to allow external AC recharging of the batteries 220. Recharge socket 230 may have any reasonable size or dimensions, and may be positioned in any reasonable position on device 10. Other embodiments may recharge batteries 220 by providing power to connector terminals 210.

Connector terminals 210 each have a contact surface 215 (FIG. 1) sized and dimensioned to electrically contact an auxiliary power harness 150 or optional jumper cable assembly 160 and are electrically coupled to batteries 220 and to switching device or solenoid 217. Connector terminals 210 are preferably incorporated where applicable so as to provide easy insertion into the auxiliary power connector 151 of various apparatus, especially passenger vehicles, trucks, boats, and aircraft. Of course, the connector terminals 210 and or plug end 110 may be specific to individual manufacturers, and could vary according to the nominal voltage of the electrical system to prevent connecting a 12 V battery to a 24 V system, or the opposite.

In some embodiments, connector terminals 210 and or plug end 110 may be configured in a manner particularly suitable for connecting to a particular type of vehicle (i.e. a truck or boat) or use specialized connectors for certain starting motor connections on some vehicles like race cars. In other embodiments, the connector terminals 210 and or special connector end 110 may be configured in a manner particularly suited for starting engines not contained in vehicles such as those utilized in power generators. Although the position of connector terminals 210 may be varied, it is preferred that connector terminals 210 be positioned at an edge of the housing 100.

Plug end 110 may be removably coupled to the rest of housing 100 to facilitate replacing connector terminals 210 and plug end 110 having a configuration suitable for one type of vehicle with one having a configuration suitable for another type of vehicle, or application. In such an embodiment, plug end 110 could be sized and dimensioned to be coupled to an electric power input terminal which is part of a standard connector 151 sized and dimensioned to receive a mating connector or plug.

In addition to, or as an alternative to being removably coupled to the rest of housing 100, plug end 110 may be movably coupled to the rest of housing 100, possibly through the use of a flexible or expandable coupling. Movably coupling the plug end 110 to the rest of the housing would allow the orientation or position of the plug end to be changed relative to, and independently of, that of the rest of the housing, facilitating easier installation in tight locations.

Housing 100 may be sized and dimensioned in a variety of ways, but it is contemplated that embodiments having housings which are approximately 1"×3"×8", 2"×3"×5", 3"×4"×7", 4"×3"×6", and 4"×5"×8" will have particular utility and may vary in weight between 2 and 12 lbs. Such "box-like" and special shaped configurations are thought to facilitate convenient handling, and are contemplated as having a case which contains the battery and solenoid or switch; such "box" allows the device to be easily taken from one application to another or to a separate external source of power for recharging. Although the embodiment of FIG. 1 shows a housing which at least partially encloses both the terminal connectors and the batteries, other embodiments may only partially enclose the batteries or the terminal connectors, or a subset of the batteries or terminal connectors. Alternatively, less preferred embodiments may not even have a housing but use some other coupling mechanism to keep the batteries and terminal connectors coupled. Possible alternatives may include, but are not limited to, coupling the batteries and terminal connectors to or within a flexible or a rigid rod, cable, or sleeve. Other configurations are contemplated as well, however, including a case with a handle or a remotely mounted pack.

It is thought that a device in which the distance between the contact surfaces 215 of the connector terminals 210 and the auxiliary batteries 220 is limited is desirable despite the potential loss of flexibility. The term "potential loss" is used because one of the advantages of the claimed device is that it is able to perform the same function as prior art devices without having many of the limitations of the prior art devices. Thus there is no need to have a second or special vehicle in order to use this device, nor is there any need to fuss with "jumper cables" which must be coiled and uncoiled and which must be maintained, transported, and tracked in addition to maintaining, transporting, and tracking the prior art device. Furthermore, the proper connection of the cables and electric power losses in long jumper cables are minimized, making more power available for the starting motor.

Preferred embodiments can be readily recharged using known circuits from the electrical output of the engine generator or alternator of the vehicle/boat, etc. or from an external AC power supply when the battery module is removed from its mounting bracket 120, such as during the winter if device were used on boats or seasonal vehicles. Since preferred embodiments of the invention will hold a charge for extended periods of time, they are contemplated to be useful even if the target engine has not been operated for long periods of time, and still retain sufficient charge and be available when needed. In some configurations a small additional set of parallel batteries may be connected for maintaining full charge voltage of the device. These optional "maintenance charge" batteries may be located within the device housing or external to the device, or be placed elsewhere for convenience with a small connecting cable to provide the small level of charge "float" current needed.

Preferred embodiments may also include a special monitor and control circuit board which allows the user to check the voltage level of the auxiliary battery to be sure it is properly charged. When a user decides to employ the device to start an engine and pushes the control button/switch 225 to activate the charge/control board circuit, or positive DC power is provided to the control terminal contact 211, the auxiliary battery is instantly connected into the vehicle power harness for a period of up to 10 minutes, as long as sufficient voltage is available in device to safely start the engine without damaging the auxiliary batteries. (A positive voltage is required on contact 211 to cause the solenoid to connect the auxiliary reserve battery to the external power harness connector, thereby connecting the power from pins 210 and the device to the engine's main power bus, or connected in parallel with the standard engine starting battery. The (optional) special control circuit continually monitors the voltage during use of the device and will disable power to the control solenoid 217, should the output voltage of the device drop below a preset level, thus protecting the batteries in the device from potential damage. Once the control circuit has disabled the power to the control solenoid, the device cannot be used again until it is fully recharged, either from the engines alternator or from an external AC charger.

Figure 7:
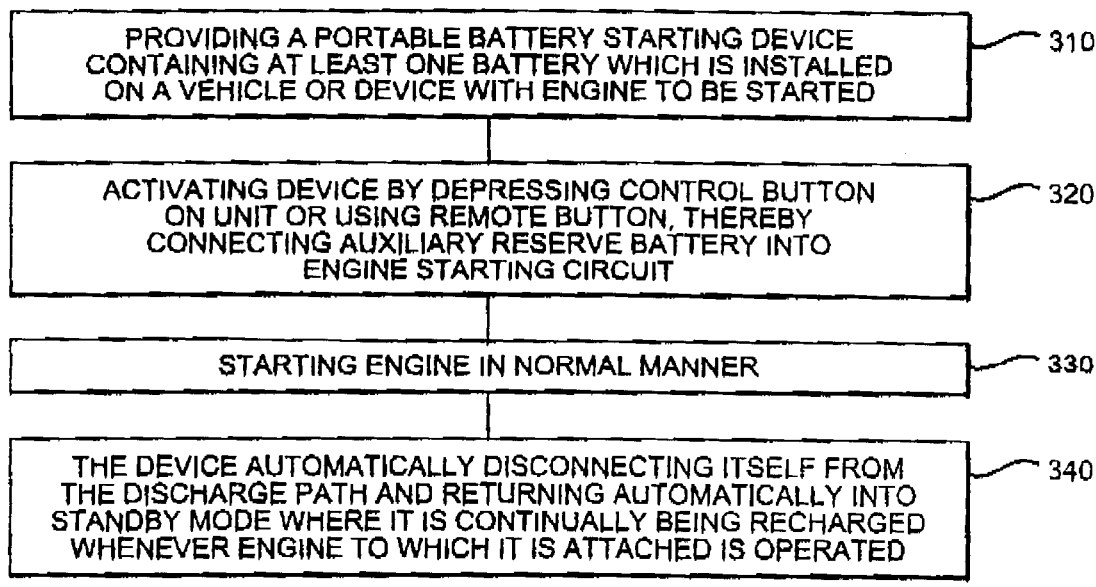
FIG. 7 is a flow chart depicting steps in use of a device according to the present invention.

FIG. 7 depicts a method of use employing steps 310, 320, 330 and 340.

Figure 5:
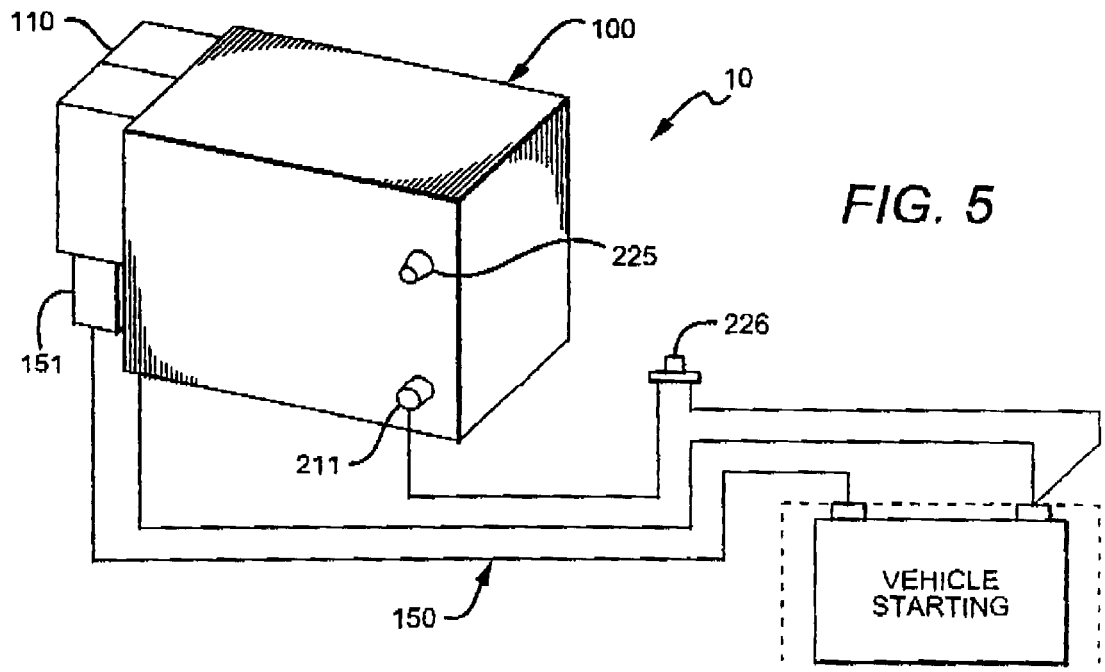
FIG. 5 is a schematic of a preferred method according to the present invention.
Figure 6:
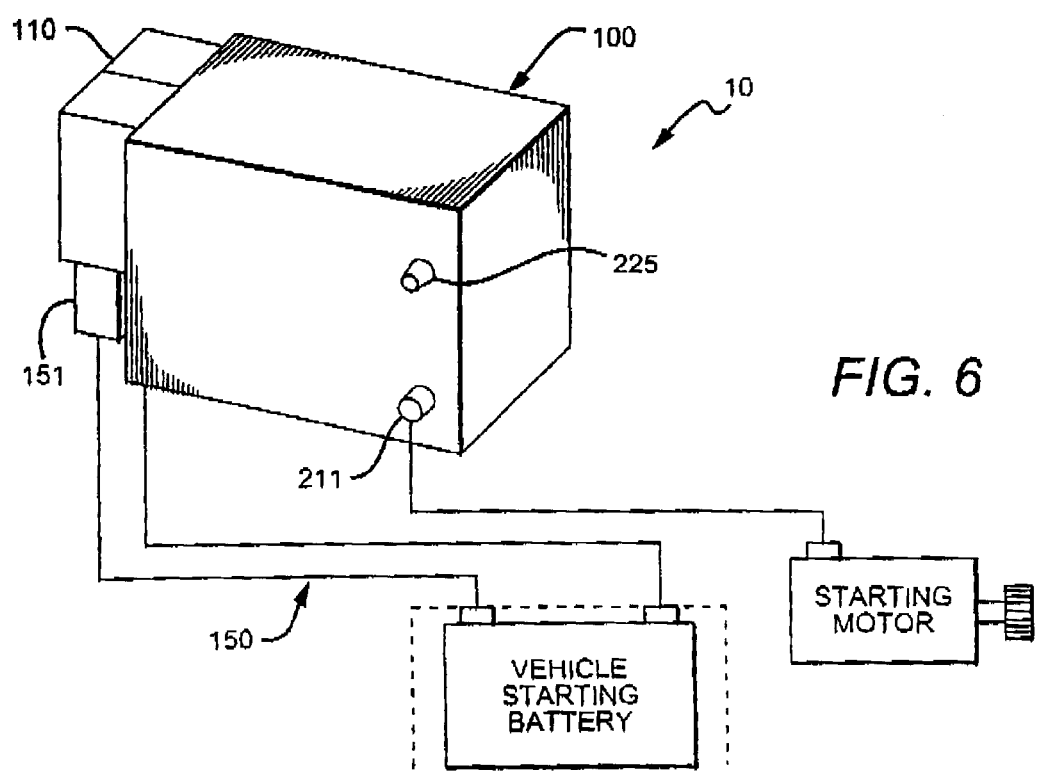
FIG. 6 is a schematic of an apparatus according to the present invention directly coupled to an engine starter.
Figure 8:
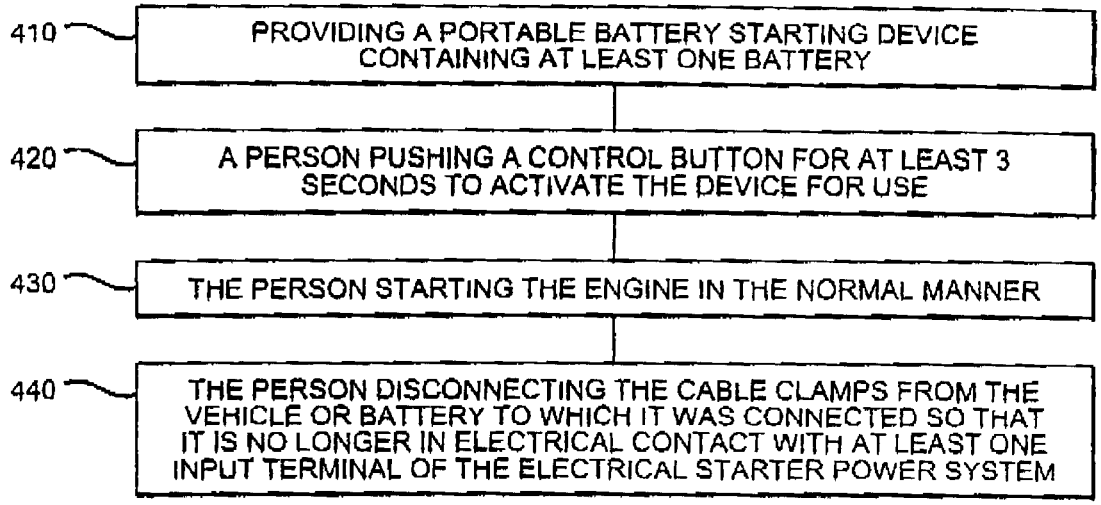
FIG. 8 is a flow chart depicting an alternative method.

Referring to FIG. 8, a preferred method for a person to temporarily provide power to an electric starting motor comprises the following steps: step 410, providing an auxiliary battery powered starting device containing at least one battery (such as device 10 of FIG. 5); step 420, the person pushing down the control button 226 for 3 or more seconds, step 430, the person starting the engine in the normal manner, and step 440, the device times out and automatically drops the solenoid coil activation connection and resets for future use.

Figure 9:
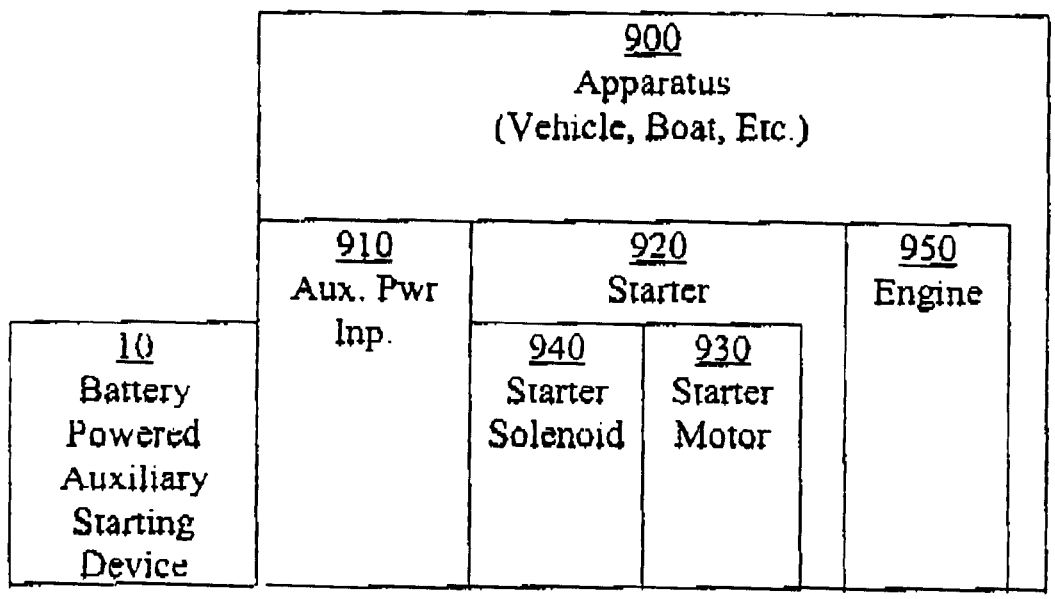
FIG. 9 is an alternative schematic of an embodiment according to the present invention.

Referring briefly to FIG. 9, in some instances an apparatus 900 may comprise an auxiliary power input 910, a power bus, a power solenoid which acts as a switch for controlling whether power from auxiliary power input 910 reaches the power bus, an electric starter 920 and an engine 950. The electric starter of the target engine may comprise an electric motor 930 for starting engine 950, and a starter solenoid 940, the starter solenoid 940 coupled to the power bus and acting as a switch for controlling whether power applied to the power bus reaches electric starter motor 930. For such embodiments, a positive voltage on contact 211 activates device output solenoid 217 to allow power from the auxiliary power input 910 to pass through the power bus of apparatus 900. Once power is provided to the power bus, it is available to all systems of apparatus 900 including, when starter solenoid 940 is activated, the electric starting motor 930.

Thus, specific embodiments and applications of the auxiliary battery starting device have been disclosed. It should be apparent, however, to those skilled in the art that many more modifications besides those already described are possible without departing from the inventive concepts herein. The inventive subject matter, therefore, is not to be restricted except in the spirit of the appended claims.

I claim:

1. An auxiliary battery (powered) starting device, comprising:

a battery; a solenoid; and a connector terminal having a first contact electrically coupled to the battery via a coupling mechanism, and sized and dimensioned to mate with an input terminal of a connector and cable to provide power to an electric starter of an engine;

wherein the device is adapted to be located on board and directly wired-in to a first vehicle and to be continually charged by the vehicle; and is adapted to be quickly removed from the first vehicle and to start the engine of a second vehicle while removed from the first vehicle.

2. The device of claim 1 wherein the coupling mechanism comprises a housing that at least partially encloses the battery and the solenoid.

3. The device of claim 2 wherein the housing is substantially rigid, and the connector terminal is located at an edge of the housing.

4. The device of claim 3 wherein the connector terminal includes a second contact and a third contact, each of which is sized and dimensioned to mate with the engine starting harness.

5. The device of claim 1 wherein the electric power output is connected in parallel with the existing standard battery for augmenting the standard existing battery output power.

6. The device of claim 1 wherein the battery is a thin film battery.

7. The device of claim 1 wherein the battery is a lithium ion battery.

8. The device of claim 1 wherein the device contains a control switch and a monitor/control circuit for monitoring voltage of the battery, and disabling the solenoid if the monitored voltage drops below a threshold.

9. The device of claim 1 wherein the coupling mechanism does not comprise a cable.

10. The device of claim 1 wherein the coupling mechanism physically limits the distance measured between the battery and the connector terminal to no more than 20 inches.

11. The device of claim 1 wherein the coupling mechanism physically limits the distance measured between the battery and the connector terminal to no more than 6 inches.

12. The device of claim 1 wherein the coupling mechanism prevents the distance between the battery and the connector terminal from varying by more than a factor of 10.

13. The device of claim 1 wherein the battery is augmented by at least one super capacitor.

14. The device of claim 12 wherein the battery is a thin film battery.

15. The device of claim 12 wherein the battery is a lithium ion battery.

16. The device of claim 1 wherein the engine is located in one of an aircraft, a passenger vehicle, an electrical generator, a combine, a tractor, a boat, and a truck.

* * * * *